United States Patent [19]

Nikles

[11] Patent Number: 5,011,756

[45] Date of Patent: Apr. 30, 1991

[54] STORAGE OF OPTICAL INFORMATION USING PHOTOCHIROPTICAL EFFECT

[75] Inventor: David E. Nikles, Middlesex, N.J.

[73] Assignee: Hoechst Celanese Corp., Somerville, N.J.

[21] Appl. No.: 486,031

[22] Filed: Feb. 27, 1990

[51] Int. Cl.$^5$ .................. G03L 11/00; G03L 1/00; C09K 19/00; B32B 3/02

[52] U.S. Cl. .................................. 430/19; 430/20; 430/495; 430/945; 346/135.1; 428/64; 428/1

[58] Field of Search ............... 430/19, 20, 495, 945; 428/1; 346/135.1; 369/110

[56] References Cited

U.S. PATENT DOCUMENTS

| | | | |
|---|---|---|---|
| 4,565,779 | 1/1986 | Arakawa et al. | 430/962 |
| 4,753,861 | 6/1988 | Tsou et al. | 430/270 |
| 4,853,911 | 8/1989 | Yamazaki | 369/110 |

*Primary Examiner*—Paul R. Michl
*Assistant Examiner*—Ashley I. Pezzner
*Attorney, Agent, or Firm*—Burns, Doane, Swecker & Mathis

[57] ABSTRACT

Provided is an optical information medium which permits the reading and writing of optical information by actively using polarized light. The optical information medium comprises an information layer containing a compound which undergoes a change upon irradiation with circularly polarized light to provide a new product which is optically active, and which is distinguishable from the original compound in its interaction with polarized light. In a preferred embodiment, the optical medium comprises optical isomers which can be selectively photolyzed by circularly polarized light. While writing must be done using a circularly polarized light source, reading of the recorded information can be accomplished using either circularly polarized light or linearly polarized light.

20 Claims, No Drawings

STORAGE OF OPTICAL INFORMATION USING PHOTOCHIROPTICAL EFFECT

BACKGROUND OF THE INVENTION

The present invention relates to a method of recording and reading optical information. More specifically, the present invention relates to the use of the photochiroptical effect in the recording and reading of optical information. The present invention also relates to a novel optical information medium for use in the method of recording and reading optical information.

A wide variety of means exists for the writing and retrieval of optical information. All of these methods involve a change in the optical characteristics of certain portions of an information layer during the writing process, with those changes being noted during the reading process. The use of an isomerization process for effecting the change in optical characteristics has been suggested, as has the switching of the optical storage material in the information layer to a plurality of oxidation states. This latter process has a potential of providing a ternary storage system.

For example, U.S. Pat. No. 4,663,270 issued to Potember et al, discloses a multistate organic optical storage medium wherein an optical beam can switch any data storage spot into three or more memory states. The storage medium consists of a mixture of bistate switching modules, or of large delocalized amphoteric molecules. The illuminated area of the optical storage medium undergoes an electrochemical topatic redox reaction thereby causing certain moieties in the illuminated area to change oxidation state. By changing the intensity of the optical "write" beam the illuminated area can be switched to a plurality of specific states with each state having a unique set of oxidation species. A ternary system can thereby be theoretically realized.

The use of isomerization as a technique in recording information in an optical medium is disclosed, for example, in U.S. Pat. No. 4,678,736 issued to Hanamura et al. The information bits are recorded by applying energy to a polydiacetylene thin film supported by a substrate, so that the main chain structure of the polydiacetylene is transformed into another form or forms. The changes are, more specifically, from the A-type bonding to the B-type bonding, and additionally from a planar configuration to a non-planer configuration. This change in form also results in a change of optical characteristics, which permits one to read the information recorded.

U.S. Pat. No. 4,686,169 issued to Yoshino et al relates to an optical disk structure in which an information layer of a photochromic dye is irradiated by laser light in order to record information. The photochromic dye exhibits the photochromizum based on a cis-trans isomerization. Such photochromic compounds include the amphipathic derivative of azobenzene, indigo or thioindigo. The dyes are stable in both the cis and trans forms, and the recorded information bit is read based upon the different light absorption spectra resulting from the two different forms.

The search continues, however, for improved systems in the recording and retrieval of optical information. The need for increased storage capacity, as well as improvements in the areas of error detection and correction, are necessary in order to provide a commercially viable system. To provide such a system is an object of the present information.

Other objects of the present invention will become apparent upon a review of the following specification and the claims appended hereto.

SUMMARY OF THE INVENTION

In accordance with the objectives, the present invention provides a novel method of writing and reading optical information, i.e., information recorded and read by optical means, e.g., use of a laser. More specifically, the present invention provides a method of reading and writing optical information by actively using polarized light in the reading and writing processes. The present invention also provides a novel optical information medium useful in a system employing the method of the present invention.

The optical information medium of the present invention comprises an information layer containing a compound which undergoes a change upon irradiation with circularly polarized light to provide a new product which is optically active, and which is distinguishable from the original compound in its interaction with polarized light. Most preferably, the optical medium of the present invention comprises a recording layer containing an optically active compound, i.e., a compound with two optical isomers, e.g., the R and the S isomers. Information is recorded and played back by the use of the "photochiroptical effect," which for the purposes of the present invention relates to the ability of light to distinguish between the two optical isomers, i.e., enantiomers. Circularly polarized light is used to selectively photolyze the R or the S isomer in order to write information. The photolysis leads to a change in the distribution of optical isomers. The reading of information is based on the ability of the system to detect this change as a change in the optical activity of the medium.

The use of the photochiroptical effect in accordance with the present invention further provides one with the ability to utilize a three state (ternary) optical data storage scheme where the three states are:

(1) racemic (50% R isomer and 50% S isomer),
(2) excess R isomer, and
(3) excess S isomer.

Such a ternary storage system has significant advantages over the present day binary systems in that it provides increased storage capacity because each data address contains more information than in a binary data storage system. Moreover, the photochiroptical effect also provides one with an improved system permitting easier error detection and correction.

DETAILED DESCRIPTION OF THE PREFERRED EMBODIMENTS

The photochiroptical effect utilized in the present invention takes advantage of the ability of circularly polarized light to distinguish between the two enantiomers of an optically active compound contained in an information layer of the present invention. An optically active compound has a different complex refractive index for left-handed circularly polarized light (LCP), $n_l = n_l - ik_l$, than for right-handed circularly polarized light (RCP), $n_r = n_r - ik_r$. The difference in the absorption index, $k_l - k_r$, provides the means for writing or erasing optical information using polarized light. The difference in complex refractive index gives rise to intensity and polarization changes in an incident light beam as it interacts with the medium containing the compound. These changes in the incident light provide a means for reading the optical information either in the transmission or in the reflection mode.

Accordingly, the optical information medium of the present invention comprises an information layer supported by a substrate, which recording layer is preferably comprised of optically active compounds. An optically active compound is a compound which rotates the plane of polarized light. If a compound is optically active, then the molecule is nonsuperimposable on its mirror image. Due to the nonsuperimposability on its mirror image, the mirror image must be a different molecule, which is its optical isomer.

In each case of optical activity of a compound, there are two and only two isomers called enantiomers, the R isomer and the S isomer. These enantiomers interact with light differently. This is to say that the R isomer will preferentially absorb one sense of circularly polarized light (for the sake of this discussion, LCP), while the S isomer will preferentially absorb the opposite sense of circularly polarized light (RCP). Consider a racemic mixture (50/50) of the R and S isomer. A LCP beam incident on the medium would be preferentially absorbed by the R isomer. If this absorption leads to some photochemistry, then the R isomer would undergo the photochemical reaction to a greater extent than the S isomer. Alternatively, a RCP beam would be preferentially absorbed by the S isomer and the S isomer would undergo the photochemical reaction to an extent greater than the R isomer. This ability of circularly polarized light to selectively photolyze the R or the S isomer is the basis for writing information using the photochiroptical effect.

The photolysis leads to a product where the distribution of R isomer and S isomer has been changed in the area irradiated. This change may be read as a change in the optical activity for the medium. Thus, the photochiroptical effect can be used to record information by selective photolysis of one of the two optical isomers to give a local change in the optical activity for the medium which can be read as a polarization state change by a transmitted or reflected read light.

The process used for data storage must therefore involve some reaction that changes the compound absorbing the writing light. A number of processes are possible. A preferred process effects a photochemical change in the recording medium that changes the distribution of optical isomers. This change, in turn, would change the optical character of the medium in those areas irradiated.

Three types of recording processes involving such a photochemical change are considered preferred. First, the change can be a selective conversion of the R or S isomer to a different chemical species, e.g., $R^l$ or $S^l$. Second, a prochiral medium, containing a compound with no optical activity, can upon irradiation generate an optical isomer. Third, and most preferably, the irradiation can effect a photochemical racemization. Racemization is a chemical process where the optical isomers are interconverted. If LCP is incident on the racemic mixture, then the R isomer is converted to the S isomer. The result is an excess of the S isomer in the irradiated material. If this process were effected by a focused laser beam, the result would be a mark with a locally high concentration of the S isomer.

Reading of the information is a detection of the change in optical activity in those spots irradiated, which detection can be made with linear or circular polarized light. Due to a different complex refractive index for LCP and RCP, a difference in the reflectance for LCP and RCP arises. Therefore, the light reflected from an optically active medium could exhibit relative polarization changes that can be used for a read scheme.

For example, consider a thin film medium consisting of a racemic mixture (i.e. 50% R and 50% S isomer) wherein the optical isomers can be interconverted. Since both isomers are present at equal concentration, the medium itself is not optically active, but it does contain optically active compounds. Upon irradiation by a focused laser beam, a mark is made that consists of a local excess of one of the optical isomers, e.g. the S isomer. This mark, i.e., information bit, is now locally optically active. A continuous polarized laser beam then scans the medium, and the polarization state of the reflected beam is monitored. As the beam scans across the mark, there will be a change detected in the polarization state for the reflected beam relative to the unwritten region. The ability to detect the polarization state changes in either reflected or transmitted light, as the light interacts with the medium, is the basis for reading information in accordance with the present invention.

The recorded information can also be erased. Consider a racemic medium marked with a laser such that the marks are optically active, e.g., as described above. The optical activity arises from a local excess of one of the optical isomers. To erase the mark, one locally racemizes the medium such that there is no longer an excess of one optical isomer over the other. This can be done by irradiating with a linearly polarized light beam. Linearly polarized light can be considered a combination of a RCP beam and a LCP beam of equal intensity and phase. When the linearly polarized beam interacts with the medium, the R and the S optical isomers absorb the light and undergo a photochemical racemization. For regions where the population of the R and S isomers are equal, the rate of interconversion for each isomer is equal. There is no net change in the composition of the medium. For the mark, there is an excess of one optical isomer (e.g., the S isomer) and this isomer absorbs light at a relatively greater rate than its enantiomer (e.g., the R isomer). Thus, more S isomer is converted to the R isomer at a faster rate than the R isomer is converted to the S isomer. This continues until the R and S isomer populations are equal. The result is to eliminate the excess population of one optical isomer and effectively erase the mark.

In a preferred embodiment, therefore, the present invention uniquely uses circularly polarized light to write data on a racemic medium by generating an excess of one optical isomer. One may write using either LCP or RCP to give data marks that comprise an excess of one optical isomer or the other depending on the polarization of the write beam.

The use of the photochiroptical effect in accordance with the present invention also provides one with the ability to utilize a three state (ternary) optical data storage scheme where the three states would be:
(1) racemic (50% R and 50% S),
(2) excess R isomer, and
(3) excess S isomer. In the ternary storage scheme, the "racemic" state is transformed to the "excess R isomer" state by writing with one polarization of circularly polarized light. Alternatively, the "racemic" state may be transformed to an "excess S isomer" state by writing with the opposite polarization of circularly polarized light. The three states can all be distinguished by the photochiroptical effect.

Such a ternary data storage scheme provides advantages over binary data storage schemes. In binary data storage a data address may contain either a 0 or a 1. However, in the ternary data storage scheme provided here, a data address may contain −1, 0, or +1. Therefore ternary data storage provides increased data storage capacity because each data address contains more information than for binary data storage.

The ternary nature of the photochiroptical effect utilized in the present invention also provides improvements in binary data storage systems. If one consistently writes on a racemic medium with LCP, then one may occasionally write with RCP to prove parity checks and other error correction information. Indeed, one may interleave writing with LCP and RCP in such a way to provide a powerful error detection and correction system with a much lower overhead. Such improvements would offer great advantages over the more conventional systems which are presently available.

Of the types of compound useful in the practice of the present invention, suitable examples are described in commonly assigned and copending U.S. application Ser. No. 485,679 filed on Feb. 27, 1990. Other suitable compounds, and in particular optical isomers, will become readily apparent upon a review of the following examples.

The following prophetic examples are provided in order to further illustrate the present invention. The examples are in no way meant to be limitative, but merely illustrative.

EXAMPLE 1

5,10,15,20-tetraphenyl-21H,23H-porphine nickel(II), 100 mg, is dissolved in 50.0 g toluene. 2-methylpiperidine, a racemic mixture of R and S isomers, 14.7 mg, is added to the toluene solution to give a five coordinate species. This gives a racemic mixture of chiral chromophores. One half of the nickel porphyrin complexes have R-2-methylpiperidine as an axial ligand, while the other half has S-2-methylpiperidine as the axial ligand. Polystyrene, 5.00 g, is dissolved in the toluene solution and the resulting solution is cast onto glass slides by spin coating. The coatings consist of a mixture of chiral chromophores in a polystyrene matrix.

Irradiation by 532 nm light effects a photochemical dissociation of 2-methylpiperidine ligand to give a different chromophore, the four coordinate species. The 2-methylpiperidine becomes free to diffuse into the polystyrene matrix, where it becomes trapped. Irradiation by a right-handed circularly polarized light beam causes one optical isomer to photodissociate faster than the other isomer. After irradiation there remains an excess population of the slower reacting species. A linearly polarized read beam detects the recorded mark as a change in the polarization as the beam passes through the film.

EXAMPLE 2

The spiropyran, 1,3′,3′-trimethylspiro[2H-1-benzothiopyran-2,2′-indole], is prepared by the method reported by R. S. Becker and J. Kolc (*Journal of Physical Chemistry* 72, 997–1001 (1968)). As prepared, this is a racemic mixture of optical isomers. A mixture of 50 mg spiropyran, 1.00 g Teflon AF 1600 (available from Dupont), and 50.0 g Fluorinert FC-43 (available from Minnesota Mining and Manufacturing Co.) is stirred until the solution is homogeneous. The solution is used to cast thin films unto glass substrates by spin coating. The recording medium consists of a thin film containing a racemic mixture of UV chromophores in a Teflon AF binder.

Upon irradiation with a 363.8 nm laser beam, the chromophore undergoes a photochemical isomerization to a merocyanine. Irradiation with left-handed circularly polarized light converts one optical isomer to the merocyanine form to a greater extent than the other optical isomer. The recorded mark then consists of a mixture of the achiral merocyanine form and an excess of the optical isomer that was converted to the merocyanine form to a lesser extent. A linearly polarized 363.8 nm read beam detects the recorded mark as a change in the polarization as the beam passes through the film.

EXAMPLE 3

The recording medium of Example 2 is irradrated by linearly polarized 363.8 nm light to convert both optical isomers to the merocyanine form. The irradiated film has no optical activity and consists of the prochiral merocyanine form in a Teflon AF polymer matrix. Upon irradiation with 780 nm right-handed circularly polarized light, the merocyanine form is converted back to the spiropyran with one optical isomer formed to a greater extent than the other optical isomer. A linearly polarized 363.8 nm read beam detects the recorded mark as a change in the polarization as the beam passes through the film.

EXAMPLE 4

Tripotassium trisoxalatochromium(III), $K_3Cr(C_2O_4)_3$, is prepared by the procedure reported by J. C. Bailor and E. M. Jones in Inorganic Svntheses volume I, 35–38 (1939). The synthesis gives a racemic mixture of optical isomers. To a mixture of 5.0 g ethanol and 10.0 g water is added 100 ml of the chromium complex and 2.00 g polyvinylalcohol. The mixture is stirred until all the components dissolve. The solution is spin coated onto polycarbonate substrates containing a 100 nm thick layer of aluminum. The recording medium then consists of a mixture of $K_3Cr(C_2O_4)_3$ optical isomers in a polyvinylalcohol matrix.

Upon irradiation with 420 nm light, a photochemical isomerization occurs and the complexes are racemized. Irradiation with circularly polarized light converts one of the optical isomers to the opposite optical isomer. The recorded mark consists of an excess of one optical isomer. Upon scanning by a linearly polarized light beam, the mark is detected by a change in polarization for the reflected beam.

EXAMPLE 5

A mixture of 100 mg 1,1′-bi-2-naphthol (racemic mixture of optical isomers), 2.00 g Teflon AF 1600, and Fluorinert FC-43 is stirred until complete dissolution. The solution is used to spin coat onto polycarbonate substrates containing a 100 nm thick layer of aluminum. The recording layer comprises a thin film of 1,1,-bi-2-naphthol in a Teflon AF matrix.

Upon irradiation with 363.8 nm light, a photochemical racemization occurs and the optical isomers are interconverted. Irradiation with right-handed circularly polarized light preferentially converts one of the optical isomers to the opposite optical isomer. The recorded mark consists of an excess of one optical isomer. Upon scanning with a linearly polarized light beam, the mark is detected as a change in polarization for the reflected beam.

Although the invention has been described with preferred embodiments, it is to be understood that variations and modification may be resorted to as will be apparent to those skilled in the art. Such variations and modifications are to be considered within purview and the scope of the claims appended hereto.

What is claimed is:

1. An optical information medium comprised of an optical information layer, wherein the optical information layer is comprised of a material at least a portion of which is treated with and selectively interacts with circularly polarized light to form a distinguishable product and which new product is distinguishable from said material on the basis of optical activity.

2. The optical information medium of claim 1, wherein the information layer is comprised of a racemic mixture of optical isomers.

3. The optical information medium of claim 1, wherein the information layer is comprised of an optical isomer which is converted into a different chemical species upon irradiation with circularly polarized light.

4. The optical information medium of claim 1, wherein the information layer is comprised of a compound exhibiting no optical activity but which generates an optical isomer upon irradiation with circularly polarized light.

5. The optical information medium of claim 1, wherein the information layer is comprised of optical isomers capable of racemization.

6. A method for recording optical information in an optical information medium which comprises,
    (i) providing an optical information medium with an information layer comprised of a compound which undergoes a change upon irradiation with circularly polarized light to provide a new product which is optically active, and which new product is distinguishable from said compound in its interaction with polarized light; and,
    (ii) irradiating the information layer with circularly polarized light modulated in accordance with the information to be recorded to thereby effect the change of the compound to the optically active new product in those areas irradiated and record information bits.

7. The method of claim 6, wherein the optical information medium provided in (i) comprises an information layer comprised of an optical isomer which is converted into a different chemical species upon irradiation with circularly polarized light, and said irradiation in (ii) effects said conversion in those areas irradiated to thereby create bits of information.

8. The method of claim 6, wherein the optical information medium provided in (i) comprises an information layer comprised of a compound exhibiting no optical activity but which generates an optical isomer upon irradiation with circularly polarized light, and said irradiation in (ii) effects said generation of an optical isomer in those areas irradiated to thereby create bits of information.

9. The method of claim 6, wherein the optical information medium provided in (i) comprises an information layer comprised of optical isomers capable of racemization upon irradiation with circularly polarized light, and said irradiation in (ii) effects a conversion of optical isomers in those areas irradiated to thereby create bits of information.

10. The method of claim 9, wherein the optical information medium provided in (i) comprises an information layer comprised of a racemic mixture of optical isomers, and said irradiation in (ii) effects a conversion of a first optical isomer to a second optical isomer in those areas irradiated to thereby create a local excess of said second optical isomer in said irradiated areas.

11. The method of claim 9, wherein the optical information medium provided in (i) comprises an information layer comprised of a racemic mixture of said optical isomers, and said irradiation in (ii) effects a conversion in certain first selected areas from a first optical isomer to a second optical isomer to thereby create a local excess of the second optical isomer in said areas irradiated, and in certain second selected areas from the second optical isomer to the first optical isomer to thereby create a local excess of the first optical isomer in said second selected areas irradiated, such that three data states exist in the optical medium.

12. A method of erasing optical information from an optical information medium, which comprises,
    (i) providing an optical information medium containing an information layer comprised of optical isomers, with bits of information contained in said information layer as local excesses of one of said optical isomers, and
    (ii) irradiating the optical information medium with polarized light to an extent sufficient to cause a photochemical racemization throughout the information layer.

13. The method of claim 12, wherein the polarized light used in (ii) is linearly polarized light.

14. A system for recording optical information in an optical recording medium, which system comprises,
    (i) a circularly polarized light source,
    (ii) an information medium containing an optical information layer comprised of a compound which undergoes a change upon irradiation with circularly polarized light to provide a new product which is optically active, and which new product is distinguishable from said compound in its interaction with polarized light, and
    (iii) means for modulating the irradiation of the optical information medium with the circularly polarized light source in accordance with the information to be recorded in the optical information medium.

15. The system of claim 14, wherein the optical information medium contains an information layer comprised of an optical isomer which is converted into a different chemical species upon irradiation with circularly polarized light.

16. The system of claim 14, wherein the optical information medium contains an optical information layer comprised of a compound exhibiting no optical activity but which generates an optical isomer upon irradiation with circularly polarized light.

17. The system of claim 14, wherein the optical information medium contains an optical information layer comprised of optical isomers capable of racemization upon irradiation with circularly polarized light.

18. The system of claim 17, wherein the information layer is comprised of a racemic mixture of said optical isomers.

19. A system for reading optical information from an optical information medium containing information recorded thereon, which system comprises,
    (i) a polarized light means, (ii) an optical information medium containing an optical information layer comprised of a compound which undergoes a change upon irradiation with circularly polarized light to provide a new product which is optically active and which new product is distinguishable from said compound in its interaction with polarized light, with bits of information being contained in said information layer in the form of localized areas of said new product, and (iii) means for irradiating the optical information medium with the polarized light source and for detecting changes in the polarization state of the light passed through or reflected from the information medium.

20. The system of claim 19, wherein the polarized light source is a linearly polarized light source.

* * * * *